Figure 1:
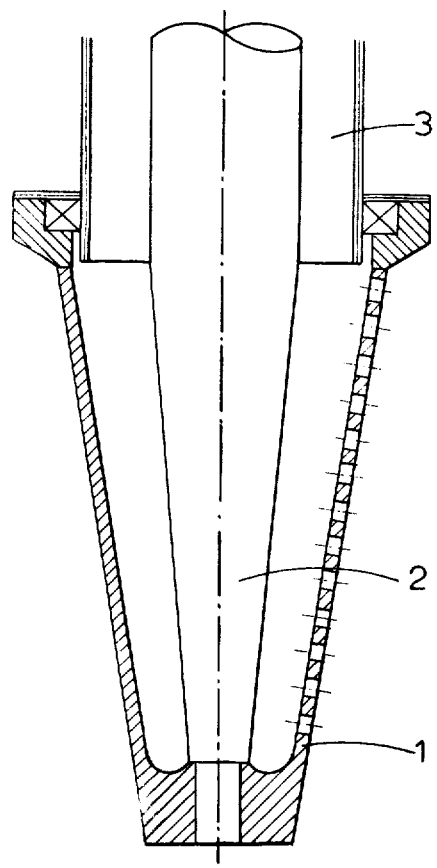

United States Patent [19]

Friestad

[11] 3,900,164
[45] Aug. 19, 1975

[54] MEANS FOR FEEDING FLUID MATERIALS TO A PRILLING BUCKET

[75] Inventor: Isak Andreas Friestad, Porsgrunn, Norway

[73] Assignee: Norsk Hydro A.S., Oslo, Norway

[22] Filed: Mar. 5, 1974

[21] Appl. No.: 448,387

[30] Foreign Application Priority Data
Mar. 8, 1973  Norway............................... 942/73

[52] U.S. Cl. .................. 239/222; 239/567; 159/4 S
[51] Int. Cl. ............................................. B05b 3/08
[58] Field of Search.......... 239/222, 222.11, 222.13, 239/222.19, 223, 1, 7, 246, 248, 553.5, 554, 567; 159/4 S, 48 R

[56] References Cited
UNITED STATES PATENTS

| | | | |
|---|---|---|---|
| 2,321,432 | 6/1943 | Somes.......................... | 239/553.5 X |
| 3,144,209 | 8/1964 | Griffiths.......................... | 159/4 S X |
| 3,561,678 | 2/1971 | Friestad.......................... | 239/222 |

FOREIGN PATENTS OR APPLICATIONS

| | | | |
|---|---|---|---|
| 669,169 | 3/1962 | Italy.................................. | 239/222 |

*Primary Examiner*—M. Henson Wood, Jr.
*Assistant Examiner*—John J. Love
*Attorney, Agent, or Firm*—Wenderoth, Lind & Ponack

[57] ABSTRACT

A method and means for feeding liquid material to the orifices of a perforated prilling bucket rotating about a vertical axis. The feed material is sprayed through orifices in the bucket wall to form droplets which are solidified to form prills, and the liquid feed is introduced into the prilling bucket in the form of a plurality of annular and laminar streams and each of the streams is directed to vertically separated orifice row zones in the wall of the prilling bucket.

6 Claims, 4 Drawing Figures

MEANS FOR FEEDING FLUID MATERIALS TO A PRILLING BUCKET

Background of The Invention

A number of industrial products are made in the form of substantially spherical granules. The processes for their production may vary. A known and well tested process is the socalled prilling process. In this process, a melt or a concentrated, warm or hot solution, which can also contain suspended particles, is split up into jets which are then further divided into droplets. These droplets are then cooled by being allowed to fall through a gas or a liquid to give a product of solidified prills.

The splitting up of the liquid into jets can be carried out in a number of ways. For instance, the melt, concentrated solution or suspension can be conducted downwardly through a horizontal, stationary, perforated plate ("nozzle plate"). The liquid head above the perforation orifices in such plate is usually moderate, about 50 to 100 cm. To roughly indicate the size of the orifices, the diameter thereof is, as a general rule, about half the desired particle diameter. Therefore, the orifices will be rather small and there is a tendency for them to get clogged. For this reason this method is more particularly used with pure melts, such as melts or concentrated solutions of ammonium nitrate and urea.

Another prilling method comprises feeding the liquid or suspensions into a perforated container which rotates about a vertical axis. The said container, in the following called a prilling bucket, can be cylindrical or, more preferably, it is conical or bowl shaped, the top portion having the greater diameter. An improved distribution of droplets over the cross-section of the prilling tower is thereby obtained. If it is desired that all rows of orifices in the prilling bucket shall produce prills of a similar average size, the lower row orifices must be made with a smaller diameter than those of the upper rows. The desired pattern of orifices will depend on a number of factors and to a certain extent is based on practical experience.

The introduction of liquid material (melt, solution or suspension) into a prilling bucket can be achieved in various ways and can, for instance, be effected through the bottom portion and/or the top portion of the bucket. When the liquid is, for instance, introduced through a hollow shaft, it will have time to accelerate so that the material at the orifices of the bucket wall will rotate with, substantially, the speed of the bucket wall. If the diameter of the bucket is large-sized and the material is introduced near the centre of the bottom of the bucket, the material will also have time to acquire a high tangential velocity before reaching the perforated wall. This is particularly the case when the suspension is viscous. The smaller the difference, at the orifices, between the tangential velocity of the liquid material and that of the bucket wall, the higher the capacity of the orifice for discharging spray liquid. At decreasing difference between these velocities, the diameter of the orifice must be reduced to maintain unchanged a given jet thickness and droplet size of sprayed liquid.

Especially when prilling suspensions it is desirable to have large orifices in the prilling bucket to avoid clogging of the orifices. Large orifices as compared to the desired prill size can be permitted by using only one row of orifices. By limiting the total supply of fluid material, the amount of material per orifice will be reduced to give thin jets and thus small granules or prills.

Even when using a bucket having a number of rows of orifices one can use large orifices by deliberately providing and taking advantage of a big difference between the velocities of the wall of the bucket and the fluid material (great "slip"). In this way the material is introduced into the orifices almost tangentially relative to the bucket wall. As a result thereof, the orifices are not completely filled with the liquid material. Thus, thin jets, and small prills, can be obtained even with orifice diameters of for instance 5 mm, so that the prill diameter/orifice diameter ratio, which in nozzle plate prillings is about 2:1, can be less than 1:2 using a prilling bucket.

A device whereby the abovementioned slip can be increased, to thereby reduce the throw distance of the drops in the cooling tower, is disclosed in our U.S. Pat. No. 3,561,678 (corresponding to Norwegian Pat. No. 122,298). The prilling bucket according to this patent is provided with a body having a surface opposing the perforated wall of the prilling bucket, which surface has a substantially similar form of rotation to that of the prilling bucket and extends substantially concentrically therewith. If liquid material is introduced into the annular space between the wall of the bucket and the surface of such body, a great "slip" and, as a result thereof, a reduced throw distance of the droplets is obtained.

In the British Pat. No. 1,126,199, there is described means, the purpose of which is to achieve a controlled supply of liquid material to different orifice row zones. The perforated wall of the prilling bucket is on the inside thereof and along the entire periphery provided with a number of protrusions or baffles. Between any two baffles the bucket wall is provided with a certain number of orifices. The liquid material is introduced into the bucket at the top thereof. The amount of liquid material not flung out from the top portion of the prilling bucket passes downward in the container via the horizontal baffles and is sprayed from the lower orifice row zones. The hydraulic pressure at each orifice will thereby be substantially the same. By adapting the number of orifices, the orifice diameter, the protrusion distance of the baffles, and the load and rotational speed, the desired particle size can be achieved, as well as prills of a uniform size from all of the orifices. It is intended, however, to make the liquid material rotate with the rotational speed of the bucket, i.e., without the abovementioned slip. Even when trying to obtain such slips, the plurality of protrusions (or baffles) would accelerate the liquid to such a tangential speed as to make such slip insignificant. The orifice diameter must, therefore, be made relatively small, thus increasing the risk of clogging. Therefore, this apparatus does not lend itself well to the prilling of liquid material, especially suspensions. The plurality of baffles inside the prilling bucket would, moreover, make the cleaning thereof rather laborious.

The use of a prilling bucket has gained particular importance in the prilling of fertilizer melts and suspensions. Commercial plants are using prilling buckets each having a capacity of more than 100 tons per hour.

The difficulty in selecting a suitable pattern of orifices in the perforated bucket increases with increasing total capacity. In practice this means that maximum throw distance for the droplets increases somewhat with increasing capacity. The particle size distribution of the product tends to become broader. The reason may be that with increasing capacity the liquid flow pattern within the prilling bucket becomes more complex. The turbulence increases, local pressure waves arise, etc.

When the sprayed droplets are to solidify during a fall through a cooling tower, it is desirable to maintain the maximum throw distance for the droplets as low as possible to limit the cost of the tower, to obtain high utilization of the cooling air and to avoid deposits of solidified material on the inside walls of the prilling bucket.

SUMMARY OF THE INVENTION

An object of the present invention is to more efficiently reduce the throw distance of the droplets in the cooling tower so that the diameter of the latter can be further reduced and at the same time it is possible to avoid clogging of the orifices in the bucket.

The invention relates to a method of feeding liquid material to the perforation orifices of a prilling bucket which rotates about a vertical axis to spray the feed material through the orifices in the walls of the bucket to produce droplets which are solidified to form prills. The term liquid material as used herein and in the claims means a melt, a concentrated hot solution or a suspension of solids in such liquid. The novel feature of the method of the invention is that the liquid is fed to the prilling bucket in the form of a plurality of annular and laminar streams, each stream being directed to vertically spaced, separate zones of orifice rows provided in the bucket.

Laminar streams will be understood to be layered streams, which can vary in thickness. Each stream can be introduced and controlled separately and can be directed to the various orifice row zones of the bucket wall. Thereby, a maximum and increased output of a given prilling bucket can be achieved, which cannot be achieved using the conventional methods. Moreover, such separate feeding permits for instance the production of a product consisting of a mechanical mixture of a slow-acting and a fast-acting fertilizer. If desired, various dyes can be added to one or more of the zones to characterize the products.

As mentioned, it is essential that each of the streams of liquid material is directed to the vertically spaced, separate zones of orifice rows. Thus, each of the streams can well be made to terminate into the bucket at some distance from the perforated wall of the bucket, whereby the wall in the prilling bucket will be divided into vertically spaced, separate zones of orifice rows. However, according to a preferred embodiment of the present method, we have found that it is desirable to direct the annular and laminar streams of liquid material nearly or all the way up to the orifice row zones of the bucket wall. As will be understood, a maximum slip at the bucket wall, as mentioned above, will thereby be obtained.

In the method of the invention a more controlled feeding of liquid material to the various zones of perforation orifices in the wall of the prilling bucket is secured. An improved control is thereby obtained in securing an advantageous relationship between available area of perforation orifices in each zone and the feeding to that zone. Since a low average delivery per orifice can be selected, also the throw distance and thus the diameter of the cooling tower can be reduced.

The method of the invention can be carried out in a number of different ways. The annular streams of liquid material feed can be directed unsymmetrically or coaxially relatively to the axis of rotation of the prilling bucket. If the various streams are directed unsymmetrically toward the orifice row zones of the wall of the prilling bucket, the particular or individual annular streams will reach the prilling bucket at different heights or altitudes of the bucket wall. Therefore, the rims of the dividing annular tubes, due to the rotation of the prilling bucket, will have a scrubbing and therefore cleansing effect on the orifices in the bucket wall. The dividing line between the various orifice row zones of the bucket wall can be more or less marked depending on whether the streams of liquid material are directed all the way up to the orifice row zones of the bucket wall or whether the streams terminate into the bucket at some distance from the orifice row zones. Each zone can be provided with one or more rows of orifices. At the more or less defined dividing lines between zones, perforation orifices can be omitted if desired.

Further, the invention relates to suitable and preferred means for carrying out the abovementioned method.

BRIEF DESCRIPTION OF THE DRAWINGS

FIGS. 1–4 respectively show sectional views through a conventional system and three embodiments of the present invention.

DETAILED DESCRIPTION OF THE INVENTION

The apparatus of the invention will be described in further detail referring to FIGS. 1–4, which show vertical sections through the axis of the prilling bucket. In a small portion of the bucket wall in FIG. 1, perforation orifices have been indicated.

FIG. 1 illustrates a conventional perforated conical prilling bucket 1, the bottom portion of which is fastened to the rotating shaft 2. The introduction of liquid material is effected at the top of the bucket through the opening 3.

Prilling buckets are usually either conical or cylindrical. If the bucket is conical (the top portion having the greater diameter), we have found an apparatus as shown in FIG. 2 to be advantageous, the liquid material being introduced in the form of laminar streams through a number of annular spaces 9 which are separated by means of cylindrical tubes 4, which are arranged in concentric relationship with the axis of rotation of the prilling bucket and the lower end of which tubes terminate into the bucket along substantially horizontal planes and near the bucket wall, whereby the latter is divided into separate orifice row zones 5, 6, 7 and 8, the wall 1 provided with orifices 12, 12, etc. The apparatus of course is not limited so as to comprise just four zones as shown in FIG. 2 since the number of zones will be dependent on the dimensions of the prilling bucket.

If the perforated wall of the prilling bucket is substantially cylindrical or moderately conical (the top portion having the greater diameter), we have found it to be desirable to use means as shown in FIGS. 3 and 4, in which the liquid material is introduced as laminar streams through a plurality of annular spaces 9 which are separated by substantially conical tubes 4' having the smaller diameter on top, which tubes are mounted concentrically in relation to the rotation axis 2 of the bucket and terminate into the latter near the wall 1 of the prilling bucket along substantially horizontal planes, whereby the wall 1, provided with orifices 12', 12', etc. is divided into zones 5', 6', 7' and 8' of orifice rows.

Generally it would be preferable if the abovementioned concentrical tubes are stationary. However, under special circumstances it may be advantagous if one or more of the tubes 9 can be brought to rotate about its vertical axis, in the same or the opposite direction to the direction of rotation of the prilling bucket. One can thereby control the degree of the abovementioned slip. In this case it would also be advantageous if the horizontal section of the tubes 9 is corrugated.

Figure 2:
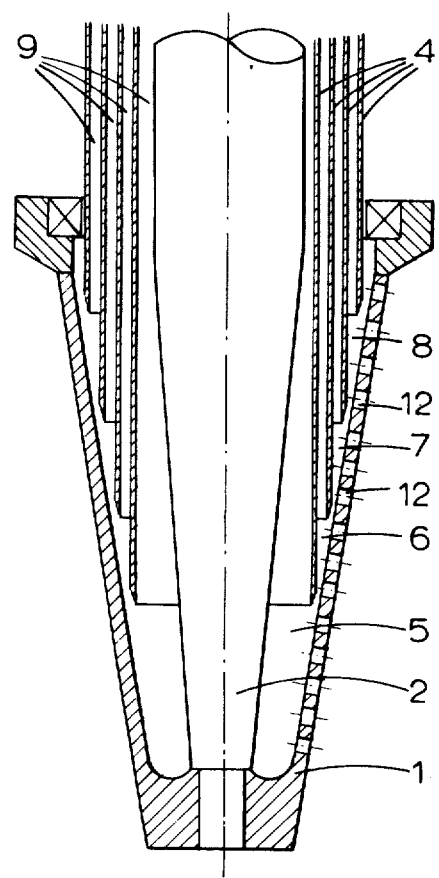

FIG. 2 illustrates the same prilling container as that shown in FIG. 1, together with the feeding means of the invention. The introduction of liquid material is here split up by means of a plurality of concentric tubes 4. In this example, the tubes extend to a close proximity of the perforated bucket wall. In this way, the wall is divided into horizontal zones of orifice rows, so that each of the zones 5 – 8 may be considered as an independent prilling bucket. The number of orifice rows in each zone as well as the orifice diameter can vary. The introduction of liquid material is effected through the annular passages 9. It is not necessary that the tubes extend all the way down to the wall of the bucket, a certain amount of "leakage" into neighbouring zones being permissible.

Figure 3:
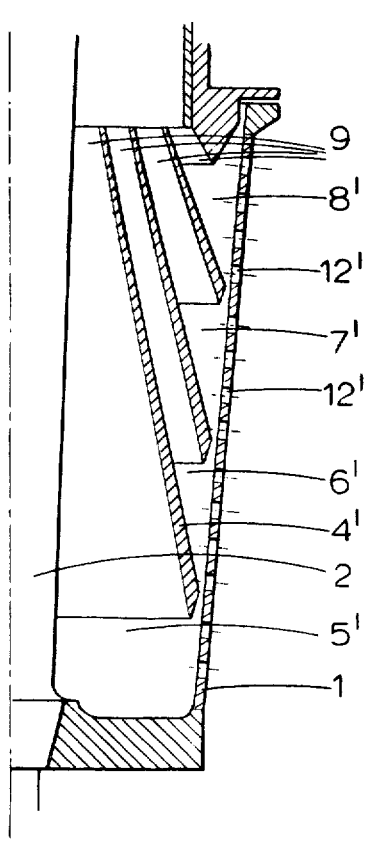

FIG. 3 illustrates how the feeding means of the invention can be constructed in case of a prilling bucket having relatively low conicity. The concentric distribution tubes 4 are made conical. The tubes are shown with an increasing wall thickness in the direction towards the bucket wall to provide a robust construction and to provide a larger surface area adjacent the bucket wall, so that the rim of the tube will not be worn away too fast due to erosion. If desired, the rim of the tube can be coated with an abrasion resistant material.

Figure 4:
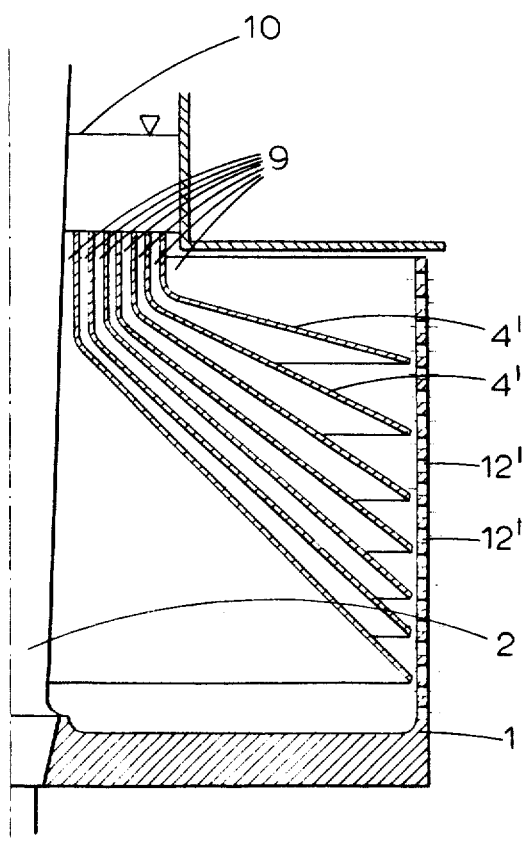

FIG. 4 is a sketch illustrating as example a corresponding feed means in a relatively large, cylindrical prilling bucket.

The number of horizontally positioned orifice row zones to which the total feed stream is distributed by the feeding means of the invention can be varied according to the effect desired. Theoretically, maximum control will be obtained using one feed zone per orifice row.

A secondary effect is achieved using the feeding means of the invention. Due to the fact that the feed stream terminates into the prilling bucket at a very short distance from the wall thereof (the orifices), very high shearing forces will be obtained in the liquid feed material. This causes the viscosity of the dispersed liquid material, which are often pseudoplastic, to decrease. Moreover, a great difference in the velocities of the liquid material and the bucket wall will arise. The high degree of slip causes the material to enter the orifice almost tangentially. As a result thereof the orifices can be made large and even so can give thin jets. The risk of obtaining clogged orifices is thereby reduced. This fact together with the reduced viscosity and the controlled feeding permits the diameter of the tower to be reduced.

As mentioned above, the tubes 4 will normally be stationary, although they may also be rotatable. The smaller the difference in velocities of the tubes 9 and the prilling bucket 1, the lower the slip obtained and the smaller the required orifice diameter. In the case of pure melts or concentrated solutions where viscosity and the risk of clogging is not very critical, a small velocity difference may be desirable since a more steady orifice flow picture will then be obtained. In the case of large prilling buckets with large tubes and a pseudoplastic, viscous suspension, it may be desirable to keep the viscosity low by permitting the tubes to rotate. In order to also obtain a high degree of slip, the tubes, if desired, may be made to rotate in a direction opposite to that of the prilling bucket.

The effect of the invention will be further illustrated below by means of four examples, in which the liquid material consists of a N,P-containing fertilizer melt containing suspended solids. The examples are not to be construed as limiting since the effect will of course also be obtained with any other compositions of liquid material.

EXAMPLE 1

A prilling bucket as shown in FIG. 1 had an inner diameter at the upper orifice row of 150 mm, the diameter being 80 mm at the lower orifice row. The distance between the upper and the lower orifice rows was 200 mm. There were 64 orifice rows, each row comprising 35 orifices, totaling 2 240 orifices. In the top row the orifice diameter was 3,8 mm. The orifice diameter decreased stepwise downwardly so that the orifice of the bottom row had a diameter of 2,4 mm.

At the top of the prilling bucket there were introduced thirtyone tons/hour of a suspension consisting of an almost anhydrous melt of ammonium nitrate and ammonium phosphates together with about 14% by weight of undissolved solids, mainly calcium phosphate. About 10% by weight of the suspension consisted of recirculated subsized granules from the solidified product having a particle size below 1,5 mm. The suspension was introduced at about 160°C. The bucket was rotated at 630 r.p.m. The sprayed droplets had a free fall in a 35 m high cooling tower.

The main portion of the solidified prills fell about 5,8 m away from the center of the tower. The maximum throw distance was about 7 m away from the center. The resulting product had the following screen analysis:

| | | | | |
|---|---|---|---|---|
| | | + 4 | mm | 1,0 % by weight |
| − 4 | to | + 3 | mm | 2,5 % by weight |
| − 3 | to | + 2 | mm | 33,5 % by weight |
| − 2 | to | + 1,5 | mm | 42,4 % by weight |
| − 1,5 | to | + 1,0 | mm | 14,8 % by weight |
| − 1,0 | to | + 0,5 | mm | 5,5 % by weight |
| − 0,5 | mm | | | 0,3 % by weight |

EXAMPLE 2

A test similar to that of example 1 was carried out except that a feeding means as shown in FIG. 2 although with a higher number of tubes, was used. Through six concentric tubes the total feed, about thirtyone tons/hour, was conducted in close proximity to the bucket wall in six zones. In order to obtain the same average grain size as in example 1, the rotational speed of the prilling bucket could now be reduced to 520 r.p.m.

The main portion of the prills now fell 5,0 m away from the centre of the tower. The maximum throw distance was now only about 6 m away from the centre.

EXAMPLE 3

A prilling bucket as shown in FIG. 1 had the same external dimensions as the bucket of example 1, but the pattern of orifice was different and the number of orifice rows was only thirty. The orifice diameter was decreasing stepwise from 4,6 mm at the top to 3,6 mm at the bottom orifice row. The number of orifices was seventy in the top row and fortysix in the bottom orifice row. The total number of orifices was 1 600.

To the top of the bucket there were introduced twentytwo tons/hour of a suspension of the same composition as in the examples 1 and 2. However, as much as about 23 % by weight of the suspension now consisted of recirculated subsized granules of a grain size below 1,5 mm. The suspension was sprayed at about 145°C. The bucket was rotated at 900 r.p.m. The sprayed droplets had a free fall in a 35 m high cooling tower.

The main portion of the solidified prills fell about 7,5 m away from the centre of the tower. The maximum throw distance was about 9 m away from the centre of the tower.

EXAMPLE 4

A test similar to that of example three was carried out, using this time a feeding means as shown in FIG. 2, the feed being introduced through six concentric tubes terminating into the bucket in close proximity to the perforated bucket wall in six different horizontal orifice row zones. In order to obtain the same average grain size as in example three, the rotational speed of the bucket could now be reduced to 750 r.p.m.

The main portion of the solidified prills now fell 5,2 m away from the centre of the tower. The maximum throw distance was reduced to about 6,5 m.

The grain size distribution of the solidified prills produced according to examples three and four was:

|      |     | + 4   | mm | 0,5 % by weight  |
|------|-----|-------|----|------------------|
| − 4  | to  | + 3   | mm | 4,5 % by weight  |
| − 3  | to  | + 2,5 | mm | 7,5 % by weight  |
| − 2,5| to  | + 2,0 | mm | 25,5 % by weight |
| − 2,0| to  | + 1,5 | mm | 36,0 % by weight |
| − 1,5| to  | + 1,0 | mm | 16,0 % by weight |
| − 1,0| to  | + 0,5 | mm | 9,5 % by weight  |
| − 0,5| mm  |       |    | 0,5 % by weight  |

I claim:

1. In a system for feeding liquid material to the orifices of a perforated conical prilling bucket which rotates about a vertical axis to throw said liquid material outwardly through said orifices of the bucket wall to form droplets which are solidified to form prills, the improvement comprising:

means for introducing said liquid material into said prilling bucket in the form of annular and laminar streams and directing each of said streams to vertically separated orifice row zones in the wall of said prilling bucket, said means comprising a plurality of cylindrical tubes defining therebetween a plurality of annular spaces, said tubes being mounted in a concentrical relationship about the axis of rotation of said prilling bucket, said tubes at their lower ends terminating adjacent said bucket wall along substantially horizontal planes, and dividing said wall into said separate orifice row zones.

2. The improvement claimed in claim 1, wherein said tubes are rotatable about their vertical axis.

3. The improvement claimed in claim 1, wherein said tubes, in the horizontal section thereof are corrugated.

4. In a system means for feeding liquid material to the orifices of a prilling bucket the perforated wall of which is substantially cylindrical or slightly conical, with its greater diameter at the top, said prilling bucket being rotatable about a vertical axis to throw said liquid material outwardly through said orifices of the bucket wall and produce droplets which are solidified to form prills, the improvement comprising:

means for introducing said liquid material into said prilling bucket in the form of annular and laminar streams and directing each of said streams to vertically separated orifice row zones in the wall of said prilling bucket, said means comprising a plurality of conical tubes with the smaller diameter at the top defining therebetween a plurality of annular spaces, said tubes being mounted in a concentrical relationship about the axis of rotation of said prilling bucket, said tubes at their lower ends terminating adjacent said bucket wall along substantially horizontal planes, and dividing said wall into said separate orifice row zones.

5. The improvement claimed in claim 4, wherein said tubes are rotatable about their vertical axis.

6. The improvement claimed in claim 4, wherein said tubes, in the horizontal section thereof are corrugated.

* * * * *